United States Patent [19]

Seay et al.

[11] Patent Number: 5,286,149
[45] Date of Patent: Feb. 15, 1994

[54] APPARATUS FOR SUPPORTING A VEHICLE INSIDE A CARGO CONTAINER

[76] Inventors: Michael W. Seay, P.O. Box 712, Springdale, Ark. 72765; Jesse R. Winchel, P.O. Box 26, Elm Springs, Ark. 72728

[21] Appl. No.: 18,173

[22] Filed: Feb. 16, 1993

[51] Int. Cl.⁵ ............................................. B60P 3/08
[52] U.S. Cl. ............................... 410/26; 187/8.41; 414/498; 410/24
[58] Field of Search .......... 414/227, 228, 229, 498; 187/8.41; 254/89 R, 47; 410/24, 24.1, 25, 26, 27, 28, 29, 29.1, 13, 18

[56] References Cited

U.S. PATENT DOCUMENTS

| | | | |
|---|---|---|---|
| 1,181,909 | 5/1916 | McFadden | 410/24 |
| 1,605,579 | 11/1926 | Conn et al. | 410/13 |
| 1,841,066 | 1/1932 | Simning | 410/24 |
| 2,233,055 | 2/1941 | Kennedy | 410/26 |
| 2,640,562 | 6/1953 | Villars | 254/89 R X |
| 3,043,454 | 7/1962 | Butler et al. | 410/26 |
| 3,205,836 | 9/1965 | Wojcikowski | 410/27 |
| 3,675,795 | 7/1972 | Dluhy | 414/234 |
| 3,750,808 | 8/1973 | Klaus | 414/229 |
| 4,668,141 | 5/1987 | Peterson | 410/24 X |
| 4,668,142 | 5/1987 | Fity et al. | 410/26 |
| 4,701,086 | 10/1987 | Thorndyke | 410/26 |
| 4,768,916 | 9/1988 | Gearin et al. | 410/18 X |
| 4,801,229 | 1/1989 | Hanada et al. | 410/26 |
| 4,963,067 | 10/1990 | Gearin et al. | 414/498 X |
| 4,992,013 | 2/1991 | Westerdale | 410/29.1 |
| 5,106,246 | 4/1992 | Chance | 410/26 |
| 5,110,242 | 5/1992 | Chance | 410/26 |

Primary Examiner—Michael S. Huppert
Assistant Examiner—James Eller
Attorney, Agent, or Firm—Timmons & Kelly

[57] ABSTRACT

A vehicle is supported on a horizontal support platform extending between two frames. As a winch is driven, a pair of cables raise the horizontal support platform upward along the frames. As the platform is raised, contact pads of the frames press against the sides of the cargo container, providing additional strength to the apparatus.

14 Claims, 5 Drawing Sheets

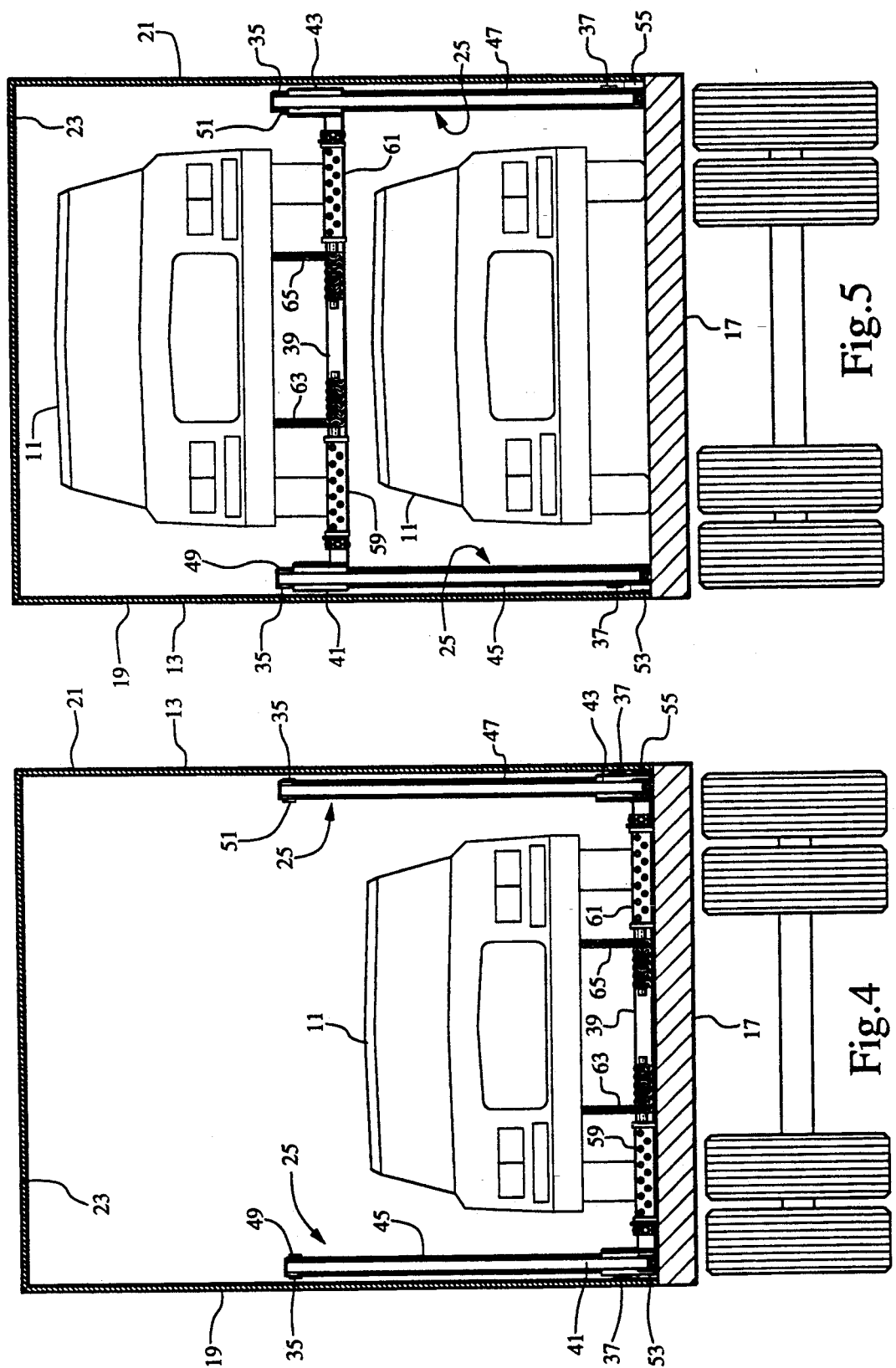

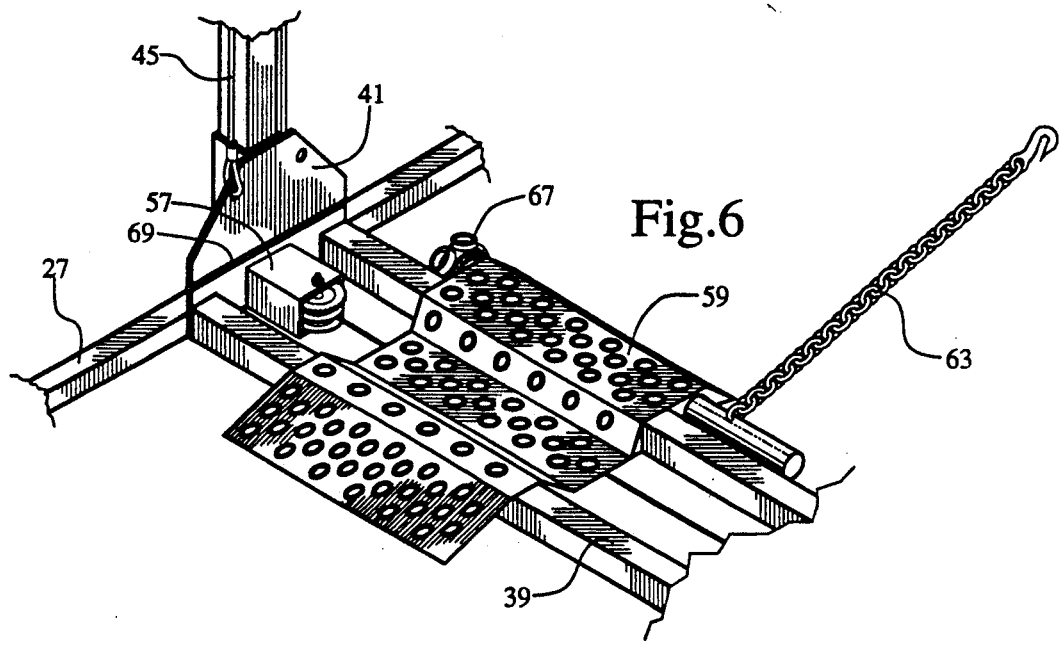
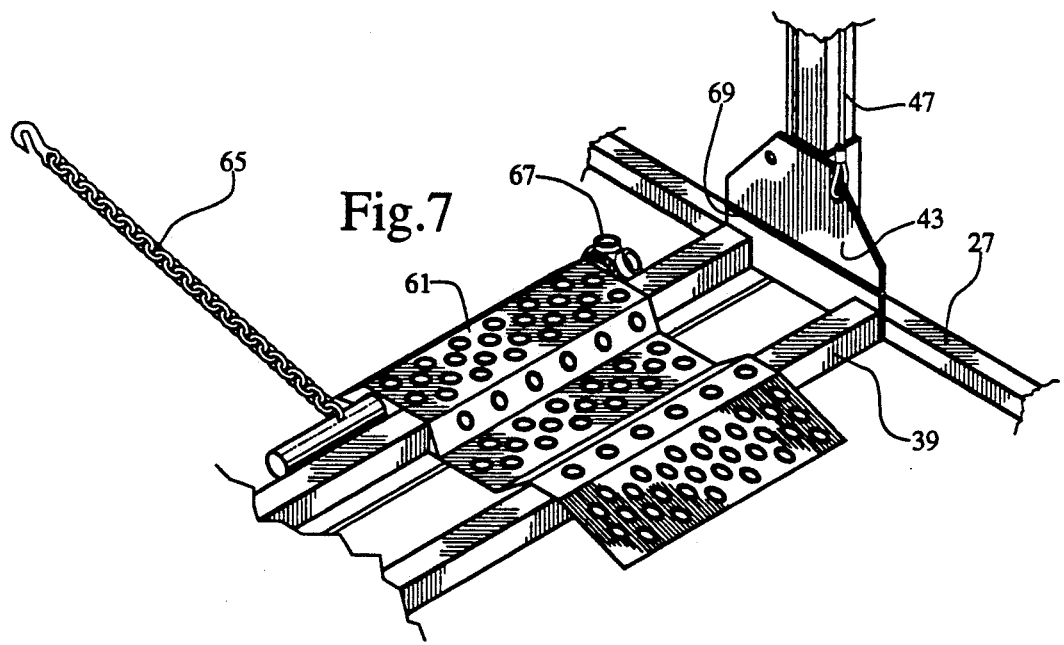

APPARATUS FOR SUPPORTING A VEHICLE INSIDE A CARGO CONTAINER

BACKGROUND OF THE INVENTION

1. Field of the Invention

This invention relates in general to apparatus for transporting vehicles. In particular, the invention relates to apparatus for raising and supporting a vehicle within a cargo container, such as a semi-trailer truck.

2. Description of the Prior Art

Automobiles, pickup trucks, and other small vehicles are often transported on semi-trailer tractor rigs. Specially designed auto carriers usually provide two levels of vehicles to increase the capacity of the tractor.

Vehicles may also be transported within the trailer of a semi-trailer tractor rig. The enclosed trailer protects the vehicles from the elements and from vandalism. Most trailers are tall enough to accommodate a second level of vehicles, thus increasing the capacity of the trailer, if the vehicles can be stored within the trailer on two levels. There existed a need for an effective, easy to use apparatus for raising and supporting vehicles on two levels within a cargo container.

Many devices have been designed and used to raise vehicles to a second level. Auto mechanics are familiar with several types of lifts, for raising vehicles about seven feet into the air, so that the mechanics can access the bottom of the vehicle. Some of these apparatus involve a metal frame having four vertical support posts. A pair of horizontal support platforms extend below the vehicle and are connected in some way to the vertical support posts. A lift mechanism, such as a winch, raises the horizontal support platforms to raise the vehicle. The upper ends of the vertical support posts are connected together with horizontal supports in order to provide stability to the frame.

SUMMARY OF THE INVENTION

The general object of the invention is to provide an apparatus for raising and supporting a vehicle within an enclosed cargo container. In general, this object is accomplished by an apparatus having a pair of vertical support posts and a horizontal support platform. A pair of connectors connect the ends of the horizontal support platform to the vertical support posts. A lift means, such as a winch, moves the connectors up and down the vertical support posts to raise and lower the horizontal support platform.

As the connectors are moved upward, the horizontal support platform forces the upper ends of the vertical support posts toward contact against the sides of the cargo container. The force of the upper ends of the vertical support posts in contact against the sides of the container adds support to the apparatus. The apparatus may include a second set of vertical support posts, a second horizontal support platform, and a second lift means.

The vertical support posts are sufficiently tall to allow the vehicle to be raised high enough to allow a second vehicle to be positioned below the first vehicle. The apparatus may also include a triangular frame to support the vertical support posts in planes parallel to the sides of the cargo container.

The above, as well as additional objects, features, and advantages of the invention will become apparent in the following detailed description.

BRIEF DESCRIPTION OF THE DRAWINGS

FIG. 4 is a sectional view of the apparatus of the invention, as seen along lines 4—4 in FIG. 1, shown with the vehicle in the lowered position.

FIG. 5 is a rear elevation of the apparatus of the invention, as seen along lines 4—4 in FIG. 11 shown with the vehicle in the raised position and with a second vehicle positioned below the first, as shown in FIG. 3.

FIG. 6 is a perspective view of the left end of the horizontal support platform.

FIG. 7 is a perspective view of the right end of the horizontal support platform.

DESCRIPTION OF THE PREFERRED EMBODIMENT

Figure 1:
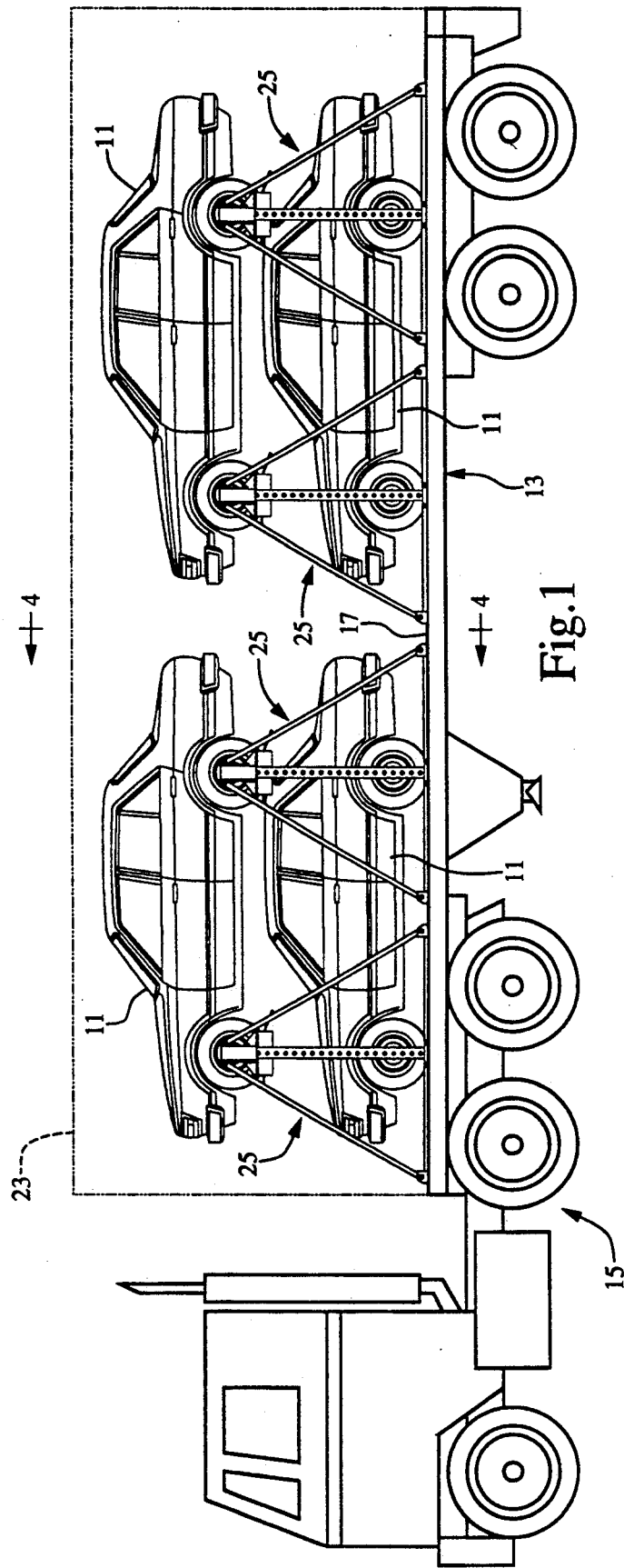
FIG. 1 is a side elevation of a semi-trailer tractor rig, with the cargo container shown in phantom for clarity, carrying several apparatuses according to the invention.

The apparatus of the invention is designed to support a vehicle 11 within an enclosed cargo container. The cargo container may be the semi-trailer 13 of a tractor-trailer rig 15, as shown in the drawings, but it may also be a shipping container or some other type of cargo container. The container 13 must have a floor 17, and two sides 19 and 21, and will probably have a top 23.

Figure 3:
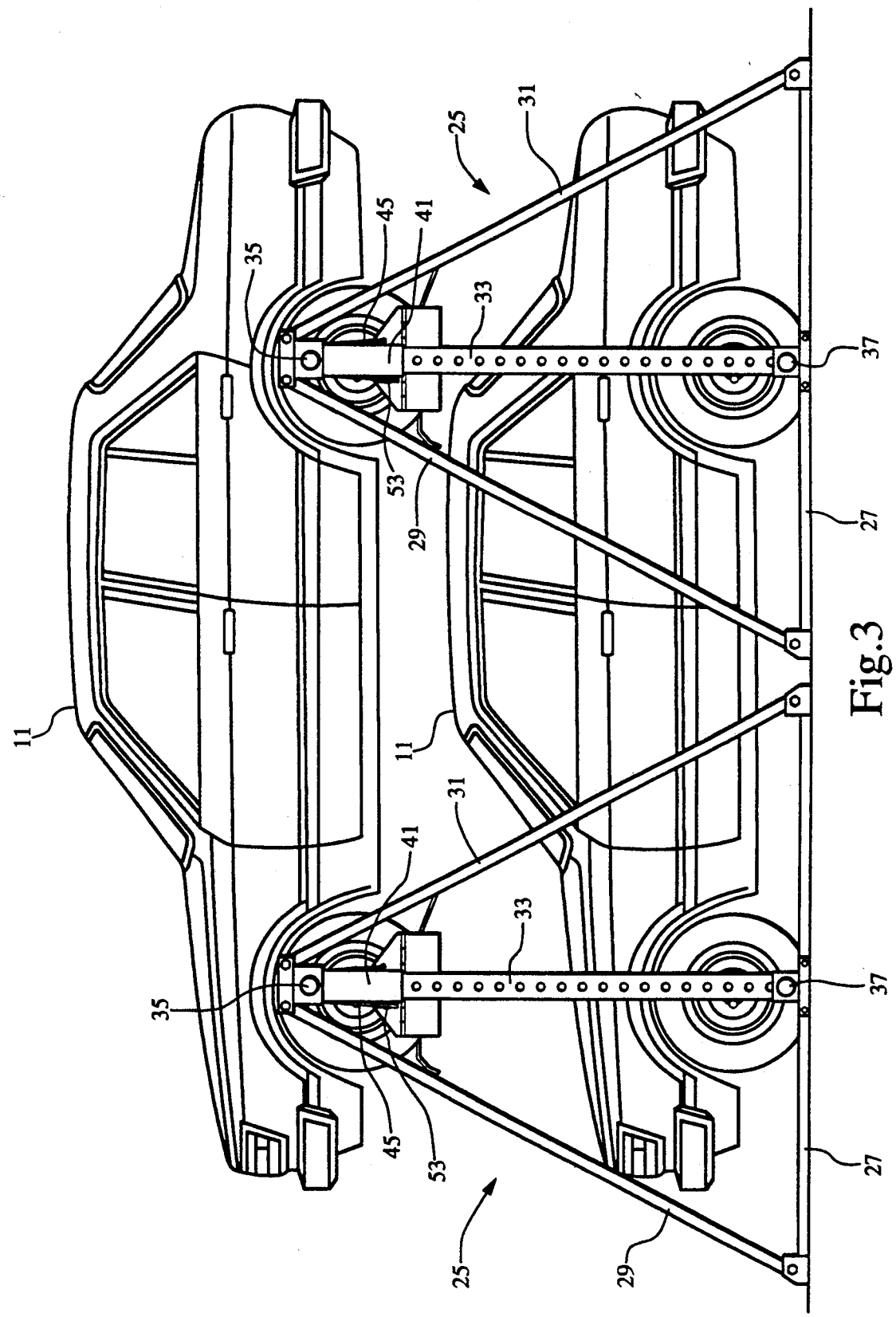
FIG. 3 is a side elevation of the apparatus of the invention, shown with the vehicle in the raised position and with a second vehicle positioned below the first.

The apparatus of the invention will raise a vehicle 11 to a height sufficient to allow a second vehicle 11 to be stored below the first vehicle 11, as shown in FIGS. 1, 3, and 5. The apparatus is temporarily installed in the cargo container 13, and is easily installed, operated, and removed.

The apparatus of the invention includes a pair of frames 25. Each frame 25 has a horizontal base 27 and two diagonal supports 29 and 31, forming a stable equilateral triangle. A vertical support post 33 extends from the middle of the horizontal base 27 to the upper ends of the diagonal supports 29 and 31.

An upper contact pad 35 is attached to each vertical support post 33 near the upper ends of the posts 33. The contact pads 35 have rubber pads that contact the sides 19 and 21 of the cargo container 13. The contact pads 35 are adjustable to the width of the cargo container 13. A similar lower contact pad 37 is attached to each vertical support post 33 near the lower ends of the posts 33. The lower contact pads 37 have rubber pads for contacting the sides 19 and 21 of the cargo container 13, and are likewise adjustable.

The two frames 25 are placed on the floor 17 of the cargo container 13, next to opposite sides 19 and 21, as shown in FIGS. 4 and 5. The first vehicle 11 is then placed between the two frames 25. A horizontal support platform 39 extends between the two vertical support posts 33, below the vehicle 11. A pair of connectors 41 and 43 are attached to the ends of the horizontal support platform 39, and connect the horizontal support platform 39 to the two vertical support posts 33.

In the preferred embodiment, the first apparatus is used to lift one end of the vehicle 11, and a second identical apparatus is used to lift the rear end of the vehicle 11, as shown in the drawings. The first horizontal support platform 39 is positioned below the front wheels of the vehicle 11, and the second horizontal support platform 39 is positioned below the rear wheels of the vehicle 11.

Figure 2:
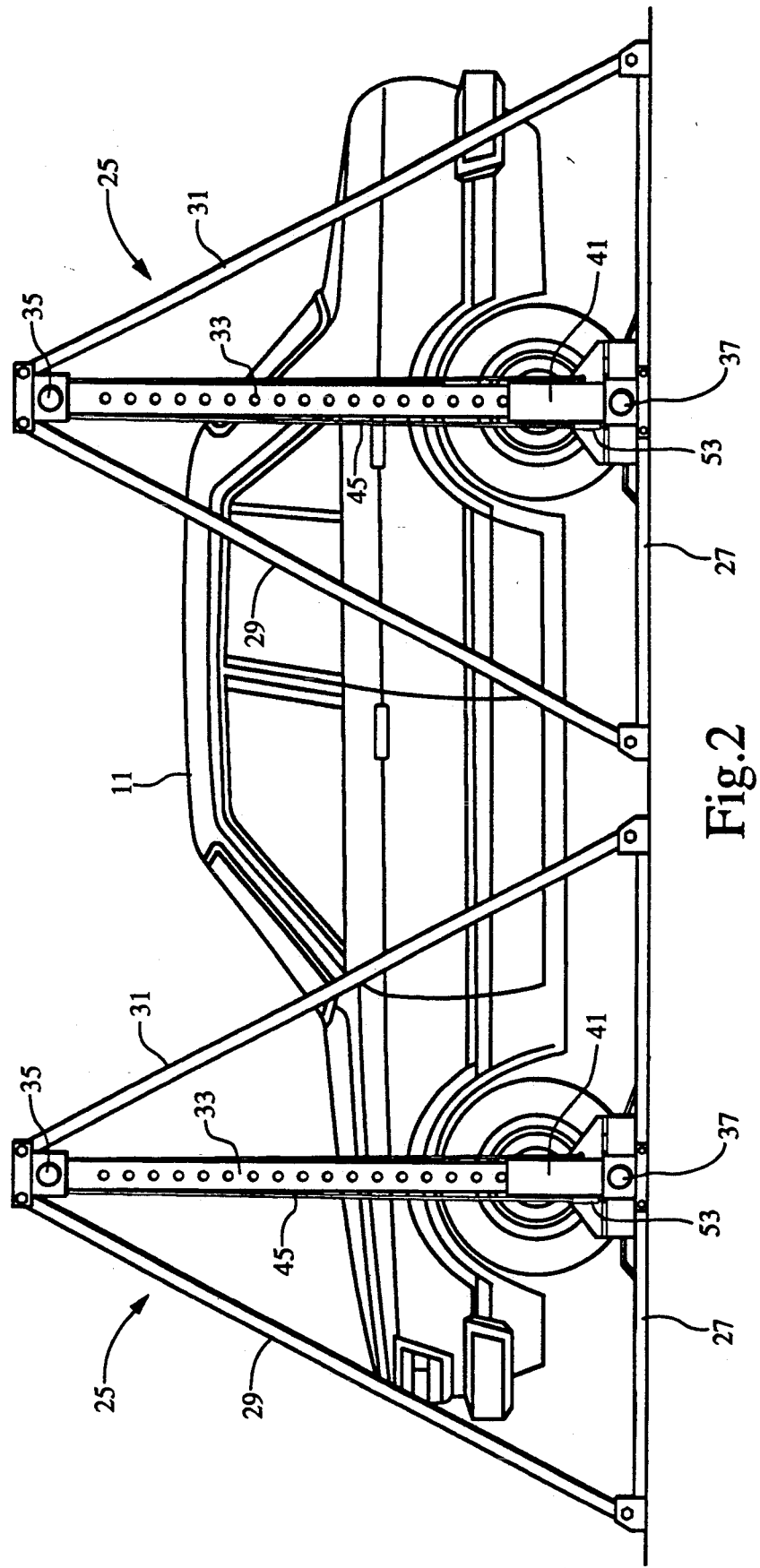
FIG. 2 is a side elevation of the apparatus of the invention, shown with the vehicle in the lowered position.

A cable 45 and 47 is attached to each of the connectors 41 and 43, as shown in FIGS. 6 and 7. Each cable 45 and 47 extends upward and over upper pulleys 49 and 51 mounted on the upper ends of the posts 33, as shown in FIGS. 4 and 5. The cables 45 and 47 then travel downward to lower pulleys 53 and 55, mounted on the connectors 41 and 43, as seen in FIGS. 2 and 3.

From the lower pulleys 53 and 55, the cables 45 and 47 then travel to a winch 57 mounted on the horizontal support platform 39, as shown in FIG. 6. The winch 57 has a pair of sheaves, so that each cable 45 and 47 is reeled in and out at the same rate. The winch 47 may be powered or hand-driven, as desired. As the winch 47 is driven, the cables 45 and 47 are reeled in or out to raise or lower the horizontal support platform 39.

As an additional safety feature, the horizontal support platform has a pair of non-slip tire supports 59 and 61, as shown in FIGS. 6 and 7. These tire supports 59 and 61 keep the tires of the vehicle from falling off of the horizontal support platform 39. Each tire support 59 and 61 also includes a chain 63 and 65, for securing the vehicle 11 to the horizontal support platform 39. These chains 63 and 65 can be hooked onto the frame of the vehicle 11. The chains 63 and 65 can then be tightened using a ratchet and pawl device 67, shown in FIGS. 6 and 7.

In operation, the apparatus of the invention is very easy to set up. Two complete sets of the apparatus are placed within the cargo container 13 for each pair of vehicles 11 to be carried, as shown in FIGS. 1-3. The first vehicle 11 is then positioned in the cargo container 13, with the front tires of the vehicle 11 on the tire supports 59 and 61 of one apparatus, and the rear tires of the vehicle 11 on the tire supports 59 and 61 of the second apparatus. The chains 63 and 65 are then hooked onto the frame of the vehicle 11, to secure the vehicle 11 to the tire supports 59 and 61.

The winch 57 is then driven to raise the horizontal support platforms 39 and the vehicle 11 to the upper position, as shown in FIGS. 1, 3, and 5. The second vehicle 11 can then be positioned below the first vehicle 11, as shown in FIGS. 1, 3, and 5. If the cargo container 13 is long enough, a second, or even a third pair of vehicles 11 may be carried on additional apparatuses.

The apparatus of the invention has several advantages over the prior art. The apparatus is simple and inexpensive, yet strong enough to securely support the vehicles 11 within the cargo container 13. The apparatus can be built inexpensively, and is relatively easy to erect and to operate.

The invention has been described in only one embodiment. it should be apparent to those skilled in the art that the invention is not so limited, but is susceptible to various changes and modifications without departing from the spirit of the invention.

I claim:

1. An apparatus for raising and supporting a vehicle within an enclosed cargo container having two opposite sides, wherein the apparatus comprises:

a pair of spaced apart vertical support posts, upstanding to a laterally displaceable upper end, each of the posts being individually positioned adjacent a relatively opposite side of the container to allow a vehicle to be received intervening therebetween;

at least one contact pad on each of the vertical support posts laterally facing the respective container side thereat;

a horizontal support platform, transversely positioned between the posts below a received vehicle and having two ends;

connectors at opposite ends of the horizontal support platform for connecting the horizontal support platform to the vertical support posts in a vertical displacement relation thereto; and lift means for moving the connectors up and down the vertical support posts to raise and lower a vehicle on the horizontal support platform, wherein the horizontal support platform when raised spreads the upper ends of said posts and the contact pads thereon into contact against the sides of the cargo container thereat.

2. An apparatus as recited in claim 1, wherein the contact pads are located near the upper ends of their respective vertical support posts.

3. An apparatus as recited in claim 2, further comprising at least one additional contact pad on each vertical support post for contacting the sides of the cargo container.

4. An apparatus as recited in claim 3, wherein the lift means further comprises:

a winch;

a pair of cables extending between the winch and each end of the horizontal support platform; and a series of pulleys for directing the cables to a vertical orientation to cause the ends of the horizontal support platform to be raised when the winch winds up the cables.

5. An apparatus as recited in claim 4, further comprising a pair of frames, each supporting one of the vertical support posts in a plane substantially parallel to the adjacent side of the cargo container.

6. An apparatus as recited in claim 5, wherein the vertical support posts are of sufficient height to allow a vehicle to be raised to a level allowing a second vehicle to be received below the first vehicle.

7. An apparatus as recited in claim 6, further comprising:

a second pair of spaced apart vertical support posts, upstanding to a laterally displaceable upper end, said second pair of support posts being longitudinally spaced from said first pair of support posts, with each positioned adjacent one side of the container to allow the vehicle to also be received intervening therebetween;

a second horizontal support platform, transversely positioned between said second support posts below the vehicle and having two ends;

second connectors at opposite ends of the second support platform for connecting the second horizontal support platform to the second pair of vertical support posts in a vertical displacement relation thereto; and second lift means for moving the second pair of connectors up and down the second pair of vertical support posts for raising and lowering the vehicle on the second horizontal support platform, wherein the second horizontal support platform when raised spreads the upper ends of the second pair of vertical support posts toward engagement with the sides of the cargo container thereat.

8. An apparatus for raising and supporting a vehicle within an enclosed cargo container having two opposite sides, wherein the apparatus comprises:
   a pair of spaced apart vertical support posts, upstanding to a laterally displaceable upper end, each of the posts being individually positioned adjacent a relatively opposite side of the container to allow a vehicle to be received intervening therebetween;
   a contact pad on each of the vertical support posts laterally facing the respective container side thereat;
   a horizontal support platform transversely positioned between said posts below a received vehicle and having two ends;
   a connector at each end of the horizontal support platform for connecting the horizontal support platform to the vertical support posts in a vertical displacement relation thereto; and
   a winch for moving the connectors up and down the vertical support posts to raise and lower a vehicle on the horizontal support platform, wherein the horizontal support platform when raised spreads said posts and the contact pads thereon into contact against the sides of the cargo container.

9. An apparatus as recited in claim 8, wherein the contact pads are located near the upper ends of the vertical support posts.

10. An apparatus as recited in claim 9 further comprising a second contact pad on each of the vertical support posts for contacting the sides of the cargo container.

11. An apparatus as recited in claim 10, further comprising:
   a pair of cables extending between the winch and each end of the horizontal support platform; and
   a series of pulleys for directing the cables to a vertical orientation to cause the ends of the horizontal support platform to be raised when the winch winds up the cables.

12. An apparatus as recited in claim 11, further comprising a pair of frames, each supporting one of the vertical support posts in a plane substantially parallel to the adjacent side of the cargo container.

13. An apparatus as recited in claim 12, wherein the vertical support posts are sufficiently tall to allow a vehicle to be raised high enough to allow a second vehicle to be positioned below the first vehicle.

14. An apparatus as recited in claim 13, further comprising:
   a second pair of vertical support posts, upstanding to a laterally displaceable upper end and spaced apart to allow the vehicle to also be received therebetween;
   a second horizontal support platform, transversely positioned between said second posts below the vehicle and having two ends;
   a second connector at each end of the second support platform for connecting the opposite ends of the second horizontal support platform to the second pair of vertical support posts in a vertical displacement relation thereto; and
   a second winch for moving the second pair of connectors up and down the second pair of vertical support posts for raising and lowering the vehicle on the second horizontal support platform, wherein the second horizontal support platform spreads the upper ends of the second pair of vertical support posts toward the sides of the cargo container when the second horizontal support platform is raised.

* * * * *